(12) United States Patent
Oka

(10) Patent No.: US 7,569,801 B2
(45) Date of Patent: Aug. 4, 2009

(54) OPTICAL HEAD, OPTICAL REPRODUCING APPARATUS, AND OPTICAL RECORDING AND REPRODUCING APPARATUS

(75) Inventor: Teiichiro Oka, Tokyo (JP)

(73) Assignee: TDK Corporation, Tokyo (JP)

( * ) Notice: Subject to any disclaimer, the term of this patent is extended or adjusted under 35 U.S.C. 154(b) by 596 days.

(21) Appl. No.: 11/013,382

(22) Filed: Dec. 17, 2004

(65) Prior Publication Data
US 2005/0135219 A1 Jun. 23, 2005

(30) Foreign Application Priority Data

Dec. 19, 2003 (JP) ............................. 2003-422298
Oct. 14, 2004 (JP) ............................. 2004-299581

(51) Int. Cl.
*G02B 7/04* (2006.01)
*G01D 5/36* (2006.01)
*G11B 7/00* (2006.01)
*G02B 5/04* (2006.01)

(52) U.S. Cl. ................... 250/201.5; 250/237 R; 369/44.21; 369/112.03; 359/833

(58) Field of Classification Search ............. 250/201.1, 250/201.2, 201.5, 216, 237 R, 237 G, 559.29, 250/200, 239; 369/44.21, 44.23, 112.01, 369/112.03, 112.04; 359/813, 819, 641, 359/642, 803, 833, 834, 838, 850; 356/218, 356/243

See application file for complete search history.

(56) References Cited

U.S. PATENT DOCUMENTS 4,715,024 A * 12/1987 Musha .................... 369/44.21

(Continued)

FOREIGN PATENT DOCUMENTS

CN 1159048 A 9/1997

(Continued)

OTHER PUBLICATIONS

Japanese Abstract of Japan; Publication No. 2002-270940 Published on Sep. 20, 2002; Application No. 2001-066445 filed Mar. 9, 2001; Applicant: Hitachi Koki Co., Ltd., Inventor: Kataoka Keiji.. *abstract*.

*Primary Examiner*—Georgia Y Epps
*Assistant Examiner*—Don Williams
(74) *Attorney, Agent, or Firm*—Edwards Angell Palmer & Dodge LLP

(57) ABSTRACT

An optical head, capable of performing output control for a light source without weakening an intensity of a light beam for recording and reproduction even if an optical element is not added anew, and an optical recording and reproducing apparatus including the optical head. Light fluxes near the center of an optical beam emitted from a light source are made incident on a diffractive element and transmitted through a beam splitter or the like to be irradiated on an optical recording medium. On the other hand, a part of peripheral light fluxes of the light beam are reflected in a direction substantially perpendicular to an optical axis by a reflection surface of a holder provided at an end of the diffractive element. Light beams reflected on the reflection surface are made incident on a photo-detector, and the photo-detector converts the light beams into an electric signal for output monitor of the light source according to an amount of received light. This electric signal for output monitor is fed back to a drive circuit of the light source to thereby perform control for an output of the light source.

14 Claims, 8 Drawing Sheets

U.S. PATENT DOCUMENTS

| | | | | |
|---|---|---|---|---|
| 4,792,674 | A * | 12/1988 | Hirano | 250/216 |
| 5,029,154 | A * | 7/1991 | Sumi et al. | 369/44.23 |
| 5,264,911 | A * | 11/1993 | Nakane et al. | 356/218 |
| 5,313,332 | A * | 5/1994 | Schell et al. | 359/813 |
| 5,313,441 | A * | 5/1994 | Imai et al. | 369/44.14 |
| 5,712,841 | A * | 1/1998 | Opheij et al. | 369/112.09 |
| 6,141,301 | A * | 10/2000 | Oakley | 369/44.23 |
| 2002/0048234 | A1 * | 4/2002 | Terashi et al. | 369/44.23 |
| 2003/0142605 | A1 * | 7/2003 | Ishika | 369/53.26 |
| 2004/0190427 | A1 * | 9/2004 | Ide et al. | 369/112.07 |

FOREIGN PATENT DOCUMENTS

| | | | |
|---|---|---|---|
| CN | 1271931 A | | 11/2000 |
| JP | 2555239 | | 8/1996 |
| JP | 10-255314 | | 9/1998 |
| JP | 2001-118281 | | 4/2001 |
| JP | 2001118281 | * | 4/2001 |
| JP | 2003-151167 | | 5/2003 |
| JP | 2003-257064 | | 9/2003 |
| JP | 2004-71073 | | 3/2004 |

* cited by examiner

SHAPE OF LIGHT FLUX

OPTICAL HEAD, OPTICAL REPRODUCING APPARATUS, AND OPTICAL RECORDING AND REPRODUCING APPARATUS

BACKGROUND OF THE INVENTION

1. Field of the Invention

The present invention relates to an optical head, which controls an output of a light source according to a front monitor system, and an optical reproducing apparatus and an optical recording and reproducing apparatus mounted with the optical head.

2. Description of the Related Art

In recording and reproduction of various kinds of optical recording media, it is necessary to control an output of a light source of an optical head used for an optical recording and reproducing apparatus so as to be accurate and to be stable under changes of an environment such as temperature and also over time. In a semiconductor laser serving as a light source used for an optical head, because its output fluctuates due to fluctuation in temperature and secular change, power control is performed by Auto Power Control (APC) to realize stabilization of a power level of light beams irradiated on an optical recording medium such as an optical disk.

As a representative system of this APC, a rear monitor system and a front monitor system are known. The rear monitor system is a system for detecting a light beam, which is emitted from a rear side of a semiconductor laser chip toward an inside of a laser package, using a photo-detector provided in the laser package. In this system, it is possible to reduce the size of an optical head because the photo-detector is provided in the laser package. At present, this rear monitor system is adopted in a read-only apparatus.

However, because a light beam emitted from an end face on an opposite side of an irradiation surface of a semiconductor laser is detected in the rear monitor system, there is a problem in that detection accuracy and the like deteriorate. Therefore, the front monitor system is adopted in recording applications that require particularly high accuracy. The front monitor system is a system for separating a part of a light beam emitted from a semiconductor laser serving as a light source, detecting the separated beams to feed back the separated beams to a drive circuit for the semiconductor laser, and controlling an output of the semiconductor laser according to an intensity of the separated beams. Note that, because the front monitor system is more accurate than the rear monitor system, the front monitor system may be used for the read-only apparatus.

An optical head adopting the conventional front monitor system (e.g., Japanese Patent No. 2555239 (paragraphs 0019 to 0020 and FIG. 1)) will be explained with reference to FIGS. 12 and 13. FIG. 12 is a side view showing a schematic structure of a conventional optical head and FIG. 13 is a plan view showing the schematic structure of the conventional optical head.

As shown in FIGS. 12 and 13, a light beam emitted from a light source 1 consisting of, for example, a semiconductor laser is split into three beams for tracking error signal generation in a diffraction element 2, changed to parallel beams by a collimating lens 3, and made incident on a beam splitter 4 as P-polarized light. The beam splitter 4 has a characteristic of transmitting about 90% of the P-polarized light and reflecting about 10% of the P-polarized light.

As shown in FIG. 12, the light beams transmitted through the beam splitter 4 are reflected on a rising reflection mirror 5, whereby an optical path of the light beams is bent. Then, the light beams are changed to circularly polarized light when the light beams are transmitted through a quarter-wave plate 6 and made incident on an objective lens 7. The light beams are changed to focused light and condensed on an information track on an information recording surface of an optical recording medium 8. Note that the objective lens 7 is mounted on an actuator 9 that is movable in at least a focusing direction and a tracking direction with respect to the optical recording medium 8.

Light reflected on the information recording surface of the optical recording medium 8 is transmitted through the objective lens 7 and converted into linearly polarized light in a direction perpendicular to the forward path up to the quarter wave plate 6. Then, the linearly polarized light is reflected by the reflection mirror 5 and made incident on the beam splitter 4 as S-polarized light.

Because the beam splitter 4 reflects almost 100% of the S-polarized light, as shown in FIG. 13, the light beams reflected on the beam splitter 4 are changed to focused light in a focusing lens 10 and given astigmatism for focus error signal generation in an anamorphic lens 11. Then, the focused light is made incident on a photo-detector 12 and converted into an electric signal in a light-receiving section of the photo-detector 12.

On the other hand, as shown in FIG. 13, the light beams reflected on the beam splitter 4, which are about 10% of the light beams emitted from the light source 1, are made incident on a photo-detector 13 for front monitor. Then, the light beams are converted into an electric signal for output monitor of the light source 1 by a light-receiving section of the photo-detector 13, and the electric signal for output monitor is used for feedback control of an output of the light source 1.

In addition, there is known a method of splitting a light beam emitted from a light source and detecting a part of the light beam with a photo-detector for front monitor to thereby perform feedback control of an output of a light source (e.g., JP 2003-151167 A (paragraphs 0025 to 0033 and FIG. 1)). This conventional technique will be explained with reference to FIG. 14. As shown in the figure, a light beam emitted from the light source 1 is made incident on a beam splitter 4. The beam splitter 4 transmits almost 100% of P-polarized light and reflects almost 100% of S-polarized light. Light beams made incident as the P-polarized light are transmitted through the beam splitter 4, converted into parallel light fluxes by a collimate lens 3, and made incident on the quarter wave plate 6. The parallel light fluxes converted into circularly polarized light by the quarter wave plate 6 are guided toward the reflection mirror 5. Most of the light fluxes including those at the center are reflected by the reflection mirror 5 to travel to the objective lens 7. A part of the light fluxes in the periphery travel straight ahead without being made incident on the reflection mirror 5 and are made incident on the photo-detector 13.

The light beams traveling to the objective lens 7 form a spot on an information track of the optical recording medium 8 through the objective lens 7. Then, the light beams reflected on the optical recording medium 8 are transmitted through the objective lens 7 again, reflected on the reflection mirror 5, and made incident on the quarter wave plate 6. Then, the light beams are converted into S-polarized light by the quarter wave plate 6 and transmitted through the collimate lens 3. Thereafter, the light beams are reflected by the beam splitter 4, made incident on the photo-detector 12, and converted into an electric signal.

On the other hand, the light beams traveling to the photo-detector 13 without being made incident on the reflection mirror 5 are made incident on the light-receiving surface of the photo-detector 13 and converted into an electric signal.

This electric signal is fed back to a drive circuit of the light source 1, whereby output control for the light source 1 is performed.

Further, there is known a method of reflecting or diffracting a part of peripheral light fluxes of a light beam emitted from a light source to thereby make the light fluxes incident on a photo-detector for front monitor and convert the light fluxes into an electric signal, and feeding back the electric signal to a drive circuit of the light source to thereby perform output control for the light source (e.g., JP 10-255314 A (paragraphs 0012 to 0016 and FIG. 1) and JP 2002-270940 A (paragraph 0010 and FIG. 7)). Here, the term "peripheral light fluxes" refers to light beams other than those in an effective range which are used for recording and reproduction effectively among light beams.

Moreover, there is known a method of reflecting a part of peripheral light fluxes of a light beam emitted from a light source on a part of an optical element constituting an optical head and making the light fluxes incident on a photo-detector for front monitor to perform output control for the light source. For example, a reflection surface is provided in a part of an optical element such as a diffraction grating, a collimate lens, and a beam splitter, light beams are reflected on the reflection surface, and the reflected light of the light beams is made incident on the photo-detector for front monitor.

However, in the case of the optical head described in Japanese Patent No. 2555239, a light beam from the light source is split by the beam splitter or the diffractive element into light beams for front monitor. Thus, an intensity of light beams for recording and reproduction traveling to the optical recording medium weakens. On the other hand, speedup of recording and reproduction of information is demanded, and in particular, in order to increase recording speed, it is necessary to irradiate light beams with a high intensity on the optical recording medium. Therefore, there is a problem in that it is not in accord with the demand for speedup of recording and reproduction of information to split a light beam for recording reproduction and using the split light beams as light beams for front monitor.

In the optical head described in JP 2003-151167 A, because peripheral light fluxes not used for recording and reproduction of the optical recording medium are used, an intensity of light beams for recording and reproduction does not weaken due to splitting of a light beam. However, in the photo-detector for front monitor, a portion for holding the photo-detector must be provided outside the light-receiving section, and there is a problem in that this portion blocks effective light fluxes when the photo-detector receives peripheral light fluxes. In addition, it is necessary to hold the light-receiving section of the photo-detector for front monitor substantially vertically with respect to incident light fluxes to secure stability of photoelectric conversion efficiency and a light-receiving amount. There is a problem in that the size of the optical head increases when the photo-detector for front monitor is arranged in this way.

In the optical head described in JP 10-255314 A and JP 2002-270940 A, a special optical element is required separately for guiding light beams to the photo-detector for front monitor, and there is a problem in that this leads to an increase in cost of the optical head and the optical recording and reproducing apparatus using the optical head. In addition, when light beams are diffracted using the diffractive element, if the diffraction angle is small, it is necessary to hold the photo-detector for front monitor substantially vertically with respect to incident light fluxes to secure stability of photoelectric conversion efficiency and a light-receiving amount. In this case, there is a problem in that the size of the optical head increases. If the diffraction angle is large, it is difficult to improve diffractive efficiency. In addition, there is a problem in that light diffracted in another direction changes to stray light to cause noise or adversely affect a servo system of the optical recording and reproducing apparatus.

In the optical head for reflecting a light beam on a part of the optical element, it is necessary to reflect the light beam on the optical element itself. Thus, there is a problem in that the size of the optical element itself increases. When an optical element made of glass is used, a process for providing a C-cut surface as a reflection surface is required, which leads to an increase in manufacturing cost. In addition, since the reflectance of the C-cut surface is increased by polishing the optical element, it is difficult to apply polishing treatment or mirror coating to the optical element in addition to the polishing.

SUMMARY OF THE PRESENT INVENTION

The present invention solves the problems described above and provides an optical head which is capable of performing output control for a light source by providing a reflection surface in a part of a component constituting the optical head, for example, a holder of the optical element, without weakening an intensity of a light beam for recording and reproduction and without requiring an additional optical element, and an optical recording and reproducing apparatus including the optical head.

According to a first aspect of the present invention, there is provided an optical head including: a light source; an objective lens that condenses light beams emitted from the light source on an information recording surface of an optical recording medium; an optical element that is provided between the light source and the objective lens and makes the light beams emitted from the light source incident on the objective lens; a holder that is provided around the optical element to hold the optical element and has a reflection surface for reflecting a part of the light beams emitted from the light source; and a photo-detector that detects the light beams reflected on the reflection surface of the holder.

According to the present invention, the light beams emitted from the light source are made incident on the optical element. Since the holder is set in the periphery of the optical element, a part of peripheral light fluxes of the light beams is irradiated on the holder. Since the holder is provided with the reflection surface, a part of peripheral light fluxes of the light beams is reflected on the reflection surface and made incident on the photo-detector. On the other hand, light fluxes near the center of the light beams are transmitted through the optical element and made incident on the objective lens. Those light beams are condensed on the information recording surface of the optical recording medium for recording and reproduction of information.

According to a second aspect of the present invention, the optical head according to the first aspect is characterized in that the holder is set at an end of the optical element.

According to the present invention, the light beams emitted from the light source are made incident on the optical element. Since the holder is set at the end of the optical element, a part of peripheral light fluxes of the light beams is irradiated on the holder. Since the holder is provided with the reflection surface, a part of peripheral light fluxes of the light beams is reflected on the reflection surface and made incident on the photo-detector.

According to a third aspect of the present invention, the optical head according to the first or second aspect is characterized in that the optical element is a diffractive element.

According to a fourth aspect of the present invention, the optical head according to the first or second aspect is characterized in that the optical element is a positive lens.

According to a fifth aspect of the present invention, the optical head according to the fourth aspect is characterized in that the positive lens is a collimate lens.

According to a sixth aspect of the present invention, there is provided an optical head characterized by including: a light source; an objective lens that condenses light beams emitted from the light source on an information recording surface of an optical recording medium; an actuator for an objective lens which has a reflection surface for reflecting a part of the light beams emitted from the light source, and moves the objective lens in an optical axis direction while supporting the objective lens; and a photo-detector that detects the light beams reflected on the reflection surface of the actuator for the objective lens.

Light fluxes near the center of the light beams emitted from the light source are made incident on the objective lens and then condensed on the information recording surface of the optical recording medium by the objective lens for recording and reproduction of information. On the other hand, a part of peripheral light fluxes of the light beams emitted from the light source is irradiated on the actuator without being made incident on the objective lens. Since the actuator is provided with the reflection surface, a part of peripheral light fluxes of the light beams are reflected on this reflection surface and made incident on the photo-detector.

According to a seventh aspect of the present invention, the optical head according to the sixth aspect is characterized in that the reflection surface of the actuator for the objective lens is formed in a base section of the actuator for the objective lens.

According to an eighth aspect of the present invention, the optical head according to the first aspect is characterized in that the holder is a housing for housing the optical element, the housing having an opening in which a reflection surface for reflecting a part of the light beams emitted from the light source is formed, and that the photo-detector is set outside the housing and detects the light beams reflected on the reflection surface and guided to an outside of the housing from the opening.

According to the present invention, a part of peripheral light fluxes of the light beams is reflected to the outside of the housing by the reflection surface formed in the opening of the housing, and made incident on the photo-detector set outside the housing. Then, those light beams are used for performing feedback control on an output of the light source.

According to a ninth aspect of the present invention, the optical head according to claim 1 is characterized in that the holder includes: a housing that has an opening formed therein and houses the optical element; and a cover having a reflection surface, which reflects a part of the light beams emitted from the light source, formed in one part thereof, the one part of the cover being inserted from the opening of the housing and introduced into the housing, the cover covering another opening with the other part of the cover, and that the photo-detector is set outside the housing and detects the light beams reflected on the reflection surface of the cover and guided to an outside of the housing from an opening of the housing.

According to the present invention, a part of peripheral light fluxes of the light beams is reflected to the outside of the housing by the reflection surface formed in the cover, and made incident on the photo-detector set outside the housing. Then, those light beams are used for performing feedback control on an output of the light source.

According to a tenth aspect of the present invention, the optical head according to any one of the first to ninth aspects is characterized in that a reflectance with respect to the light beams is higher on the reflection surface than in a periphery of the reflection surface.

The reflectance on the reflection surface can be increased by, for example, sticking an aluminum foil or the like, or applying paint for increasing the reflectance, onto the reflection surface.

According to an eleventh aspect of the present invention, the optical head according to any one of the first to tenth aspects is characterized in that the reflection surface is covered with one of resin and a rust-preventive agent.

According to a twelfth aspect of the present invention, there is provided an optical head characterized by including: a light source; an objective lens that condenses light beams emitted from the light source on an information recording surface of an optical recording medium; a beam shaping prism that is provided between the light source and the objective lens, the beam shaping prism having an optical surface on which the light beams emitted from the light source are made incident, and a reflection surface that is formed at a predetermined angle with respect to the optical surface and reflects a part of the light beams emitted from the light source; a collimate lens that is set between the light source and the beam shaping prism; and a photo-detector that detects the light beams reflected on the reflection surface.

Light fluxes near the center of the light beams emitted from the light source are transmitted through the optical surface of the beam shaping prism and made incident on the objective lens. Then, those light beams are condensed by the objective lens on the information recording surface of the optical recording medium and used for recording or reproduction of information. On the other hand, a part of peripheral light fluxes of the light beams emitted from the light source is irradiated on the reflection surface of the beam shaping prism. Then, the part of peripheral light fluxes of the light beams is reflected on the reflection surface and made incident on the photo-detector.

According to a thirteenth aspect of the present invention, the optical head according to the twelfth aspect is characterized in that the beam shaping prism includes a first beam shaping prism and a second beam shaping prism and reflects a part of the light beams emitted from the light source on a reflection surface that is formed at a predetermined angle with respect to an optical surface of the first beam shaping prism.

According to the present invention, for instance, a deviation in the refraction angle of the light beams which occurs in the first beam shaping prism can be offset by an opposite deviation in the refraction angle which occurs as the light beams transmit through the second beam shaping prism. As a result, there is no fear that the optical axis of the light beams may incline as the light beams travel from the beam shaping prism to the objective lens.

According to a fourteenth aspect of the present invention, the optical head according to the twelfth or thirteenth aspect is characterized in that the angle formed by the optical surface and the reflection surface is one of a right angle and an obtuse angle.

According to a fifteenth aspect of the present invention, the optical head according to the twelfth or thirteenth aspect is characterized in that the beam shaping prism also serves as a beam splitter.

According to a sixteenth aspect of the present invention, the optical head according to the fifteenth aspect is characterized in that the angle formed by the optical surface and the reflection surface is an acute angle.

According to a seventeenth aspect of the present invention, the optical head according to any one of the twelfth to sixteenth aspects is characterized in that at least an emission-side opening of a holder of the collimate lens has a keyhole shape.

According to an eighteenth aspect of the present invention, there is provided an optical reproducing apparatus characterized by including: the optical head according to any one of the first to seventeenth aspects; and control means for controlling an output of the light source based on a signal from the photo-detector of the optical head.

According to a nineteenth aspect of the present invention, there is provided an optical recording and reproducing apparatus characterized by including: the optical head according to any one of the first to seventeenth aspects; and control means for controlling an output of the light source based on a signal from the photo-detector of the optical head.

According to the optical head in accordance with the first to seventh aspects of the present invention, since the reflection surface is provided in a part of the holder that holds the optical element, or in the actuator, it is unnecessary to provide an optical element for splitting a light beam anew. This makes it possible to realize a reduction in cost of the optical head. In addition, whereas the optical head itself is thick to hold the light-receiving section in the optical head described in JP 2003-151167 A, it is possible to reduce the thickness of the head even if the head holds the light-receiving section because a light beam is reflected on the optical head. Moreover, since the holder is provided in the periphery of the optical element (e.g., at the end of the optical element), it is possible to reflect peripheral light fluxes of a light beam, and an intensity of light beams used for recording and reproduction does not weaken. As a result, it is possible to perform recording and reproduction of information at high speed. Further, since it is unnecessary to increase the size of the optical element as compared with the case in which a light beam is reflected on the optical element, it is possible to prevent an increase in the size and cost of the optical head.

According to the optical head in accordance with the eighth and ninth aspects of the present invention, since the reflection surface is provided in the housing or the cover set on the housing, it is unnecessary to provide an optical element for splitting a light beam anew. This makes it possible to realize a reduction in cost of the optical head. In addition, since the reflection surface is provided on the side of the housing or the cover set on the housing, it is possible to reflect peripheral light fluxes of a light beam, and an intensity of light beams used for recording and reproduction does not weaken. Moreover, since the opening is formed on the side of the housing and a light beam is guided to the outside of the housing from the opening, it is less likely that the light beam changes to stray light in the housing. As a result, it is possible to perform feedback control for an output of the light source 1 without affecting recording or reproduction.

According to the optical head in accordance with the tenth aspect of the present invention, since a reflectance of the reflection surface is increased, it is possible to detect peripheral light fluxes of light beams used for feedback control of an output of the light source 1 with high sensitivity.

According to the optical head in accordance with the eleventh aspect of the present invention, since the reflection surface is covered with resin, it is possible to prevent a decline in a reflectance due to deterioration with age.

According to the optical head in accordance with the twelfth to seventeenth aspects of the present invention, since the reflection surface is provided in a part of the beam shaping prism, it is unnecessary to provide an optical element for splitting a light beam anew. This makes it possible to realize a reduction in cost of the optical head. Moreover, the optical surface and the reflection surface are provided, and light beams reflected on the reflection surface are made incident on the photo-detector, whereby an intensity of light beams transmitted through the optical surface, which are used for recording and reproduction, does not weaken. As a result, it is possible to perform recording and reproduction of information at high speed. According to the optical head in accordance with the thirteenth aspect of the present invention, since the two beam shaping prisms forming a pair are used, it is possible to offset deviation of an angle of refraction, which is likely to occur in one beam shaping prism, with the other beam shaping prism. Thus, an optical axis of a light beam traveling from the beam shaping prisms to the objective lens does not become inclined. Consequently, it is possible to prevent deterioration in the quality of a light spot focused on the information recording surface of the optical recording medium and deviation of a condensing position in the photo-detector for detecting light beams for recording and reproduction.

According to the optical reproducing apparatus in accordance with the eighteenth aspect of the present invention and the optical recording and reproducing apparatus in accordance with the nineteenth aspect of the present invention, since the optical head of the present invention is mounted, it is possible to realize a reduction in cost of the optical reproducing apparatus and the optical recording and reproducing apparatus. Moreover, since an intensity of light beams used for recording and reproduction does not weaken, it is possible to perform recording and reproduction, in particular, recording of information at high speed.

DETAILED DESCRIPTION OF AN EXEMPLARY EMBODIMENT

An optical head in accordance with embodiments of the present invention will be hereinafter explained with reference to FIGS. 1 to 11, FIG. 15, and FIG. 16.

First Embodiment

Figure 1:
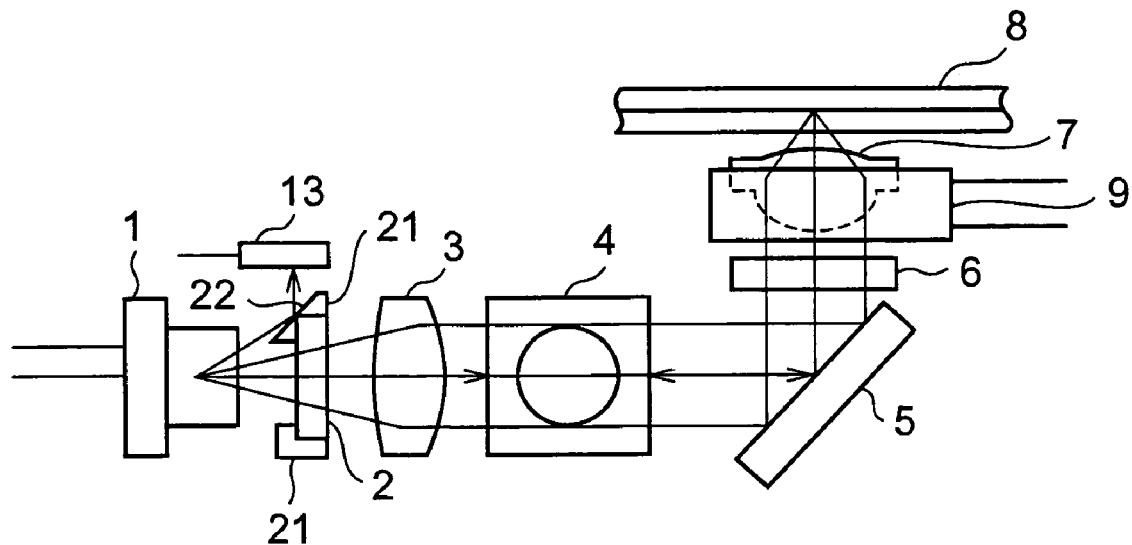
FIG. 1 is a side view of an optical head in accordance with a first embodiment of the present invention.
Figure 2:
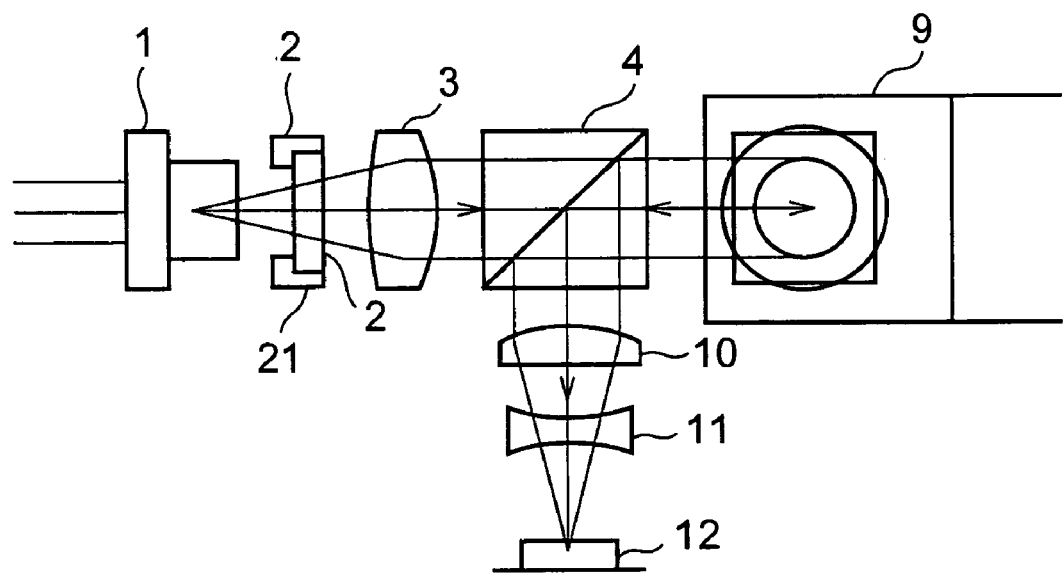
FIG. 2 shows a top view of the optical head in accordance with the first embodiment.
Figure 3:
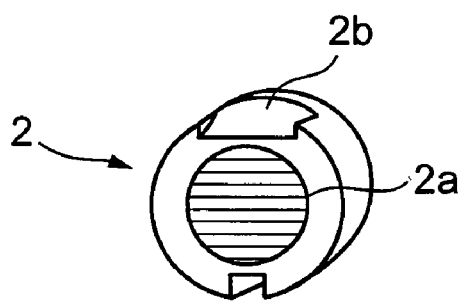
FIG. 3 is a perspective view of a diffractive element used for the optical head in accordance with the first embodiment.

A structure and actions of an optical head in accordance with a first embodiment of the present invention will be explained with reference to FIGS. 1 to 3. FIG. 1 is a side view of the optical head in accordance with the first embodiment. FIG. 2 is a top view of the optical head in accordance with the first embodiment. FIG. 3 is a perspective view of a diffractive element used for the optical head in accordance with the first embodiment.

As shown in FIGS. 1 and 2, a light flux near the center of a light beam emitted from a light source 1 consisting of a semiconductor laser is transmitted through a diffractive element 2 and split into three beams for tracking error signal generation in the diffractive element 2. On the other hand, a part of peripheral light fluxes of the light beam are reflected in a direction substantially perpendicular to an optical axis by a reflection surface 22 provided in a holder 21 for holding the diffractive element 2. The light flux near the center of the light beam is used for recording and reproduction of information, and a part of the peripheral light fluxes are used for output control for the light source 1. Because the holder 21 is provided at an end of the diffractive element 2, a part of the peripheral light fluxes of the light beam are reflected on the holder 21.

Note that the diffractive element 2 is required to adjust an inclination of a spot of ± primary diffractive light with respect to a recording track of an optical recording medium at the time of assembly and adjustment of the optical head. Therefore, the diffractive element 2 is incorporated in the holder 21, which can be rotated around the optical axis, and then the holder is incorporated in a housing of the optical head. The reflection surface 22 for reflecting a part of peripheral light fluxes of a light beam is provided in the holder 21 of the diffractive element 2.

The diffractive element 2 is a resin molded product, which is manufactured by molding, and may also serve as the holder 21. The diffractive element 2 having the function of the holder 21 will be explained with reference to FIG. 3. As shown in FIG. 3, a diffraction grating 2a is formed in the center of the diffractive element 2, and light beams transmitted through this part among light beams made incident on the diffractive element 2 are used for recording and reproduction of information. In addition, a reflection surface 2b, which inclines at an angle of about 45° with respect to a direction perpendicular to the diffractive element 2, is formed at an edge of the diffractive element 2. Among light beams that have exited from the light source 1, light beams reflected on the reflection surface 2b in a direction substantially perpendicular to an optical axis of the light beams are used for output control for the light source 1. Because the reflection surface 2b is formed at the edge of the diffractive element 2, peripheral light fluxes of the light beams are reflected on the reflection surface 2b.

Note that in order to increase a reflectance on the reflection surfaces 22 and 2b, aluminum foils may be stuck on the reflection surfaces 22 and 2b or paint with a high reflectance may be applied to the reflection surfaces 22 and 2b.

The light beams transmitted through the diffractive element 2 are changed to parallel beams by a collimating lens 3 and made incident on a beam splitter 4 as P-polarized light. The beam splitter 4 has a characteristic of transmitting about 100% of the P-polarized light. As shown in FIG. 1, the light beams transmitted through the beam splitter 4 are reflected on a rising reflection mirror 5, whereby an optical path of the light beams is bent. Then, the light beams is changed to circularly polarized light when the light beams pass through a quarter wave plate 6 and made incident on an objective lens 7. The light beams are changed to focused light in the objective lens 7 and condensed on an information track on an information recording surface of an optical recording medium 8. Note that the objective lens 7 is mounted on an actuator 9 that is movable in at least a focusing direction and a tracking direction with respect to the optical recording medium 8.

The light beams reflected on the information recording surface of the optical recording medium 8 are transmitted through the objective lens 7 and converted into linearly polarized light in a direction perpendicular to the forward path up to the quarter wave plate 6 in the quarter wave plate 6. Then, the light beams are reflected by the reflection mirror 5 and made incident on the beam splitter 4 as S-polarized light.

Because the beam splitter 4 has a characteristic of reflecting almost 100% of the S-polarized light, as shown in FIG. 2, the light beams reflected on the beam splitter 4 are changed to focused light in a focusing lens 10 and given astigmatism for focus error signal generation in an anamorphic lens 11. Then, the focused light is made incident on a photo-detector 12, and the photo-detector 12 converts the focused light into an electric signal according to an amount of the received light. A predetermined arithmetic operation is performed on the converted electric signal to generate a focus error signal, a tracking error signal, and a reproduction signal.

On the other hand, as shown in FIG. 1, of the light beams emitted from the light source 1, the light beams reflected on the reflection surface 22 of the holder 21 are made incident on a photo-detector 13. Then, the photo-detector 13 converts the light beams into an electric signal for output monitor of the light source 1. This electric signal for output monitor is fed back to a driver circuit of the light source 1 to thereby perform control of an output of the light source 1. Note that the photo-detector 13 is equivalent to the "photo-detector" of the present invention.

As described above, because the reflection surface 22, which reflects a part of light beams emitted from the light source 1, is provided in the holder 21 for holding the diffractive element 2 constituting the optical head, it is unnecessary to provide an additional optical element for feedback control. This makes it possible to reduce the size and cost of the optical head. In addition, because the holder 21 is provided at the end of the diffractive element 2, and the reflection surface 22 is formed in the holder 21, peripheral light fluxes of a light beam made incident on the diffractive element 2 are reflected on the reflection surface 22, and feedback control for the light source is performed using the reflected light beams. As a result, because an intensity of light beams transmitted through the diffractive element 2, which serve as light beams for recording and reproduction, does not weaken, and it is possible to realize speedup of recording and reproduction of information. In addition, because the photo-detector 13 is arranged substantially parallel to the optical axis, it is possible to reduce the thickness of the optical head. Moreover, because a reflection surface is not provided in the diffractive element 2 itself, the diffractive element 2 does not increase in size.

Second Embodiment

Figure 4:
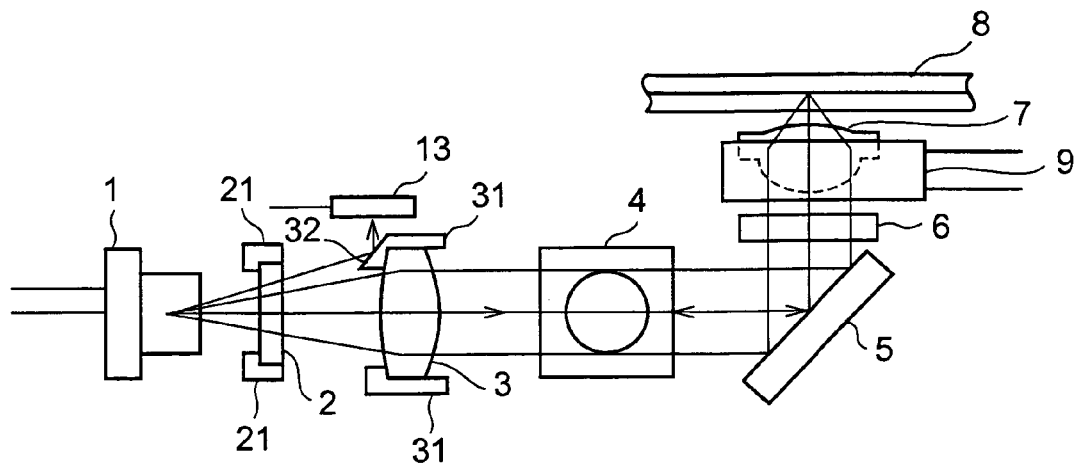
FIG. 4 is a side view of an optical head in accordance with a second embodiment of the present invention.

A structure and actions of an optical head in accordance with a second embodiment of the present invention will be explained with reference to FIG. 4. FIG. 4 is a side view of the optical head in accordance with the second embodiment.

The optical head in accordance with the second embodiment has substantially the same structure as the structure of the optical head in accordance with the first embodiment but is different from the optical head in accordance with the first embodiment in that a reflection surface is provided in a holder for the collimating lens 3 instead of the holder 21 for the diffractive element 2. Therefore, unlike in the first embodiment, a light beam is reflected by the holder of the collimating lens 3 to perform output control for the light source 1

The collimating lens 3 may be directly attached to a housing or may be attached to the holder and then incorporated in the housing of the optical head. For example, when it is necessary to adjust parallelism of light fluxes having transmitted through the collimating lens 3 or when the collimating lens 3 consists of a lens group that is a combination of several lenses, the holder is used in order to control fluctuations in the performance of the optical head. In such cases, as shown in FIG. 4, a reflection surface 32 is provided in a holder 31 that holds the collimating lens 3 at an outer edge thereof.

In addition, the collimating lens 3 is a resin molded product manufactured by molding and may also serve as the holder 31. In that case, the reflection surface 32 is formed at an edge of the collimating lens 3 at an angle of about 45° with respect to a direction perpendicular to the collimating lens 3. As in the first embodiment, paint, aluminum foil, or the like may be applied or stuck on the reflection surface 32 in order to increase a reflectance of the reflection surface 32

As shown in FIG. 4, a light beam emitted from the light source 1 is made incident on the diffractive element 2 and split into three beams for tracking error signal generation. Then, the light beams transmitted through the diffractive element 2 are made incident on the collimating lens 3. Of the light beams, light beams transmitted through the collimating lens 3 are changed to parallel beams and used for recording and reproduction of information. On the other hand, a part of peripheral light fluxes of the light beam are reflected in a direction substantially perpendicular to an optical axis by the reflection surface 32 provided in the holder 31 for holding the collimating lens 3. Light fluxes near the center of the light beam are used for recording and reproduction of information, and a part of the peripheral light fluxes are used for output control for the light source 1. Because the holder 31 is provided at an end of the collimating lens 3, a part of the peripheral light fluxes of the light beam are reflected on the holder 31. Note that when the reflection surface 32 is formed at an edge of the collimating lens 3, the peripheral light fluxes of the light beam are reflected on the reflection surface 32.

The light beams transmitted through the collimating lens 3 are transmitted through the beam splitter 4 or the like and condensed on the information track of the optical recording medium 8 by the objective lens 7 as in the optical head in accordance with the first embodiment. Then, the light beams reflected on the optical recording medium 8 are made incident on the photo-detector 12 through the same optical path as the optical head in accordance with the first embodiment and converted into an electric signal.

On the other hand, as shown in FIG. 4, the light beams reflected on the reflection surface 32 of the holder 31 are made incident on the photo-detector 13. Then, the light beams are converted into an electric signal for output monitor of the light source 1 and used for feedback control for an output of the light source 1.

As described above, because the reflection surface 32, which reflects a part of light beams emitted from the light source 1, is provided in the holder 31 for holding the collimating lens 3 constituting the optical head, it is unnecessary to provide an additional optical element for feedback control. This makes it possible to reduce the size and cost of the optical head. In addition, because the holder 31 is provided at the end of the collimating lens 3, and the reflection surface 32 is formed in the holder 31, peripheral light fluxes of a light beam made incident on the collimate lens 3 are reflected on the reflection surface 32, and feedback control for the light source 1 is performed using the reflected light beams. As a result, because an intensity of light beams transmitted through the collimating lens 3, which serve as light beams for recording and reproduction, does not weaken, it is possible to realize speedup of recording and reproduction of information. Moreover, because a reflection surface is not provided in the collimating lens 3 itself, the collimating lens 3 does not increase in size Note that, in this embodiment, a light beam emitted from the light source 1 is changed to parallel beams using the collimating lens 3. However, the present invention is not limited to the collimating lens 3, and any lens may be adopted as long as the lens is a so-called positive lens. In other words, it suffices that the lens used have a function of focusing light beams, which are emitted from the light source 1 and diverge, and making the focused light beam incident on an objective lens. For example, the lens may be a planoconcave lens, a biconcave lens, a meniscus lens, or the like.

Third Embodiment

Figure 5:
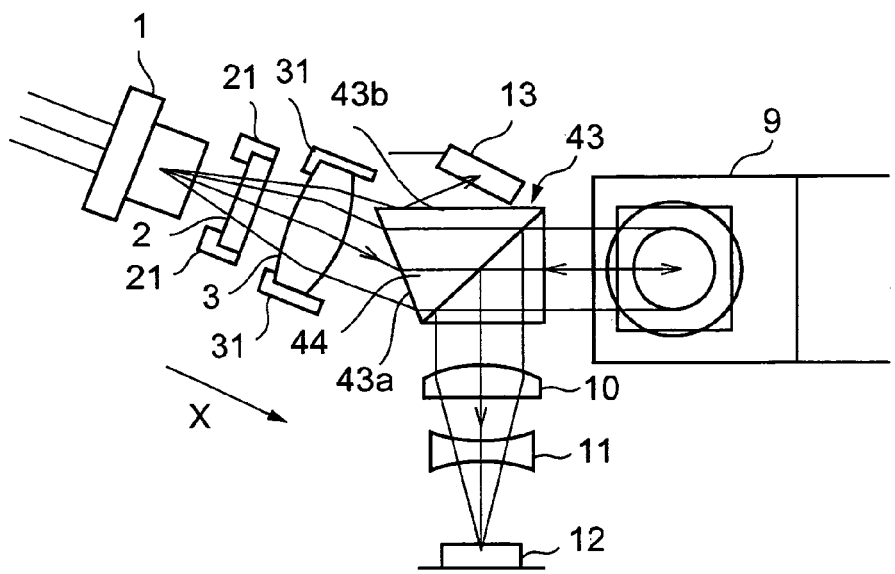
FIG. 5 is a top view of an optical head in accordance with a third embodiment of the present invention.

A structure and actions of an optical head in accordance with a third embodiment of the present invention will be explained with reference to FIGS. 5 to 7. FIG. 5 is a top view of the optical head in accordance with the third embodiment.

The optical head in accordance with the third embodiment has substantially the same structure as the structure of the optical heads in accordance with the first and the second embodiments, but is different from the optical heads in accordance with the first and the second embodiments in that a compound prism 43, which is obtained by adding a function of a beam shaping prism to the beam splitter 4, is used.

Here, the beam shaping prism will be explained. In general, a light beam emitted from a semiconductor laser has an intensity distribution of an elliptical shape. In order to irradiate the light beam having the intensity distribution of an elliptical shape on an information recording surface of an optical recording medium as a high-quality condensed spot, correction for bringing the intensity distribution close to a circular shape is performed. In this case, in general, an element (means) having a beam shaping function, for example, a beam shaping prism is arranged between the collimating lens 3 and the beam splitter 4. In this embodiment, the compound prism 43, which is obtained by adding a function of the beam shaping prism to the beam splitter 4, is used As shown in FIG. 5, a light beam emitted from the light source 1 is made incident on the diffractive element 2, split into three beams for tracking error signal generation, and then made incident on the collimating lens 3 to be changed to parallel beams. A light flux sectional shape of the parallel beams emitted from the collimating lens 3 is an elliptical shape.

Then, the light beams changed to the parallel beams by the collimating lens 3 are made incident on the compound prism 43. At this point, in order to shape the light flux sectional shape into a circular shape from the elliptical shape, the respective optical elements are arranged such that a normal of a surface 43a (equivalent to the optical surface of the present invention) forms a predetermined angle with respect to an optical axis of the light beams. Among the light beams, those which is made incident on the surface 43a of the compound prism 43 and transmitted through the compound prism 43 are used for recording and reproduction of information. On the other hand, a part of light beams, which are not made incident on the surface 43a but reflected on, for example, a side face 43b (equivalent to the reflection surface of the present invention) of the compound prism 43 are used for output control for the light source 1.

The light beams transmitted through the compound prism 43 are condensed on the information track of the optical recording medium 8 as in the first and the second embodiments. Then, the light beams reflected on the optical recording medium 8 are made incident on the photo-detector 12 through the same optical path as the first and the second embodiments and converted into an electric signal.

On the other hand, as shown in FIG. 5, the light beams reflected on the side face 43b of the compound prism 43 are made incident on the photo-detector 13. Then, the light beams are converted into an electric signal for output monitor of the light source 1 and used for feedback control for an output of the light source 1. Note that, as in the first and the second embodiments, in order to increase a reflectance, for example, mirror coating may be applied, paint may be applied more simply, or an aluminum foil may be stuck to the side face 43b of the compound prism 43. In addition, it is preferable from the point of manufacturing and arrangement of the compound prism 43 that the side face 43b of the compound prism 43 and a side opposed to the side face 43b are parallel to each other. It is also preferable to make an angle formed by the surface 43a and the side face 43b (the surface 43a and the side face 43b may not be adjacent to each other) acute.

Figure 6:
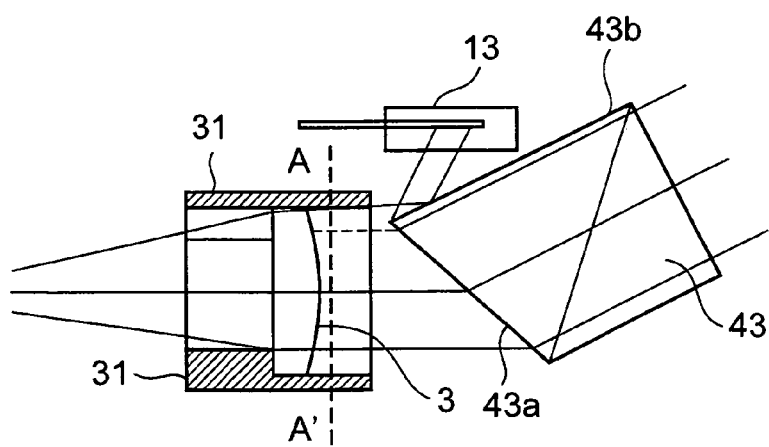
FIG. 6 is an enlarged top view of a collimate lens and a compound lens, which are used for the optical head in accordance with the third embodiment.
Figure 7:
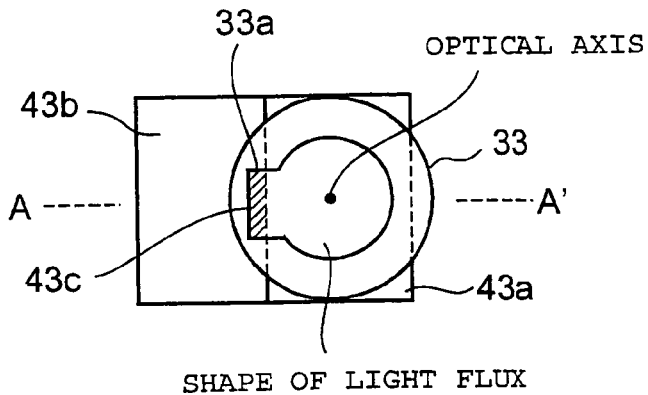
FIG. 7 is a sectional view of the collimate lens and the compound lens used for the optical head in accordance with the third embodiment.

FIGS. 6 and 7 show plan views of the collimating lens 3 and the compound lens 43. FIG. 6 is an enlarged top view showing the collimating lens 3 and the compound lens 43. FIG. 7 is a sectional view taken along line A-A of FIG. 6 viewed from the light source 1 side (X direction shown in FIG. 5)

As shown in FIG. 6, the surface 43a and the side face 43b of the compound prism 43 are formed obliquely with respect to an optical axis such that a part of light beams are reflected on the side face 43b. The size of the collimating lens 3 used in this embodiment is sufficiently large compared with the size of projection of the surface 43a of the compound prism 43 on a surface perpendicular to the optical axis. By using the collimating lens 3 and the compound prism 43 having such sizes, the light beams transmitted through the end of the collimating lens 3 are irradiated on the side face 43b without being made incident on the surface 43a of the compound prism 43 and are reflected on the side face 43b to be made incident on the photo-detector 13.

Moreover, in order to prevent unnecessary occurrence of stray light, as shown in FIG. 7, a holder 33 of a ring shape having a slit 33a formed in a part thereof may be provided on an emission side of the collimating lens 3. By providing the holder 33, the light beams transmitted through the slit 33a of the holder 33 travel to the side face 43b and are irradiated on a part of the side face 43b (a shaded part 43c in FIG. 7). The photo-detector 13 is arranged such that most of the light beams irradiated on the part of the side face 43b (shaded part 43c) can be received. The holder 33 of the ring shape having the slit 33a formed in a part thereof is provided, whereby an opening on the emission side is formed in a "keyhole shape".

As described above, the light beams transmitted through the collimate lens 3 are reflected on the side face 43b of the compound prism 43 arranged for shaping beams, and made incident on the photo-detector 13. Consequently, it is unnecessary to provide an optical element anew for feedback control, and it is possible to reduce a size and cost of the optical head. In addition, since the light beams reflected by the side face 43b are used, an intensity of the light beams transmitted through the compound prism 43, which serve as light beams for recording and reproduction, does not weaken. Thus, it is possible to realize speedup of recording and reproduction of information.

Fourth Embodiment

Figure 8:
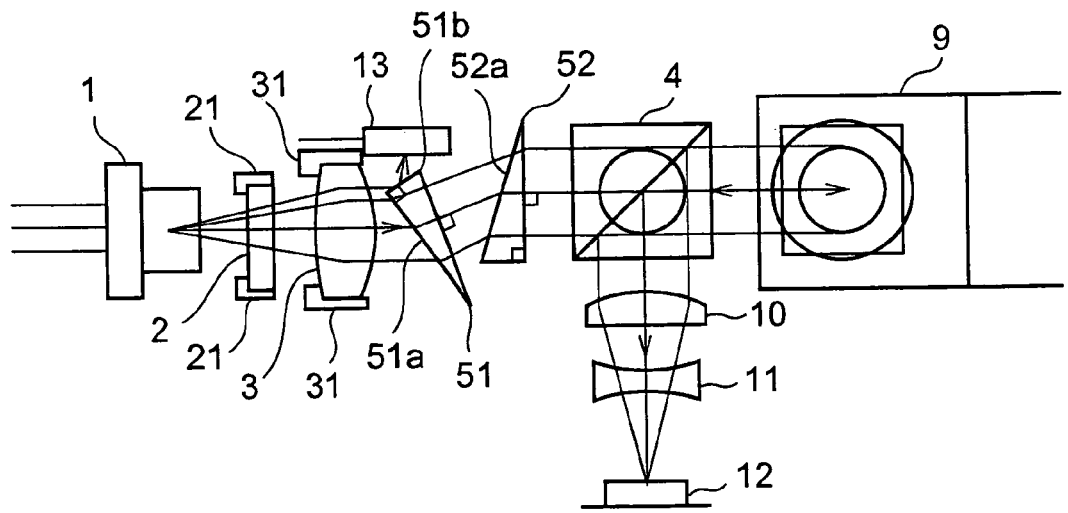
FIG. 8 is a top view of an optical head in accordance with a fourth embodiment of the present invention.

A structure and actions of an optical head in accordance with a fourth embodiment of the present invention will be explained with reference to FIG. 8. FIG. 8 is a top view of the optical head in accordance with the fourth embodiment.

The optical head in accordance with the fourth embodiment has substantially the same structure as the structure of the optical heads in accordance with the third embodiment but is different from the optical heads in accordance with the third embodiment in that beam shaping prisms and the beam splitter are separately provided.

In the optical head in accordance with this embodiment, as shown in FIG. 8, beam shaping prisms 51 and 52 of a wedge form are arranged in a pair between the collimating lens 3 and the beam splitter 4.

As shown in FIG. 8, a light beam emitted from the light source 1 is made incident on the diffractive element 2, split into three beams for tracking error signal generation, and then made incident on the collimating lens 3 to be changed to parallel beams.

Then, the light beams changed to the parallel beams by the collimating lens 3 are transmitted through the beam shaping prisms 51 and 52 to be shaped into light fluxes of a substantially circular intensity distribution. The beam shaping prisms 51 and 52 have the same angle formed by a surface on which the light beams are made incident and a surface from which the light beams are emitted (apical angle) and the same angle formed by the surface on which the light beams are made incident and an optical axis of the incident light. In addition, because an optical axis of light beams to be emitted is perpendicular to the surface from which the light beams are emitted, in general, the beam shaping prisms 51 and 52 having the same shape are used. Note that, in this embodiment, the light beams reflected on the side 51b (equivalent to the reflection surface of the present invention) of the beam shaping prism 51 are used for output control for the light source 1.

It is desirable that, in the beam shaping prism 51, one angle other than the apical angle be formed as a right angle in order to reduce wastes during polishing at the time of manufacturing. In this case, light reflected on the beam shaping prism 51 rises against incident light when the right angle is arranged closer to the light source 1 side. Thus, light can be received from the front of the photo-detector 13 arranged substantially parallel to the incident light, and a light-receiving characteristic is stabilized. Therefore, it is preferable that the right angle of the beam shaping prism 51 is arranged closer to the light source 1 side. However, one angle other than the apical angle is not limited to the right angle and may be an obtuse angle.

The light beams are refracted to be shaped when transmitted through the beam shaping prisms 51 and 52. The light beams transmitted through the beam shaping prism 52 are made incident on the beam splitter 4 at a right angle. Then, as in the first to the third embodiments, the light beams are transmitted through the beam splitter 4 and condensed on the information track of the optical recording medium 8. The light beams reflected on the optical recording medium 8 are made incident on the photo-detector 12 through the same optical path as the first to the third embodiments and converted into an electric signal.

On the other hand, as shown in FIG. 8, the light beams reflected on the side 51b of the beam shaping prism 51 are made incident on the photo-detector 13. Then, the light beams are converted into an electric signal for output monitor of the light source 1 and used for feedback control for an output of the light source 1.

Note that, since the beam shaping prisms 51 and 52 of a wedge shape are arranged in a pair, when a wavelength of the light beam emitted from the light source 1 is short, an angle of refraction fluctuates due to wavelength dispersion of a refractive index of a prism glass material at the time of wavelength shift. Thus, it is possible to prevent deviation of an optical axis after beam shaping and make the light beam incident on the beam splitter 4 at a right angle.

Effects attained by the beam shaping prisms 51 and 52 will be explained in detail. When a semiconductor laser of a short wavelength represented by, in particular, a GaN semiconductor laser is used as the light source 1 for the optical head in accordance with the third embodiment, if a wavelength of the light source 1 deviates from a design wavelength due to fluctuation of respective light sources or a change in ambient temperature, an angle of refraction on the surface 43a shown in FIG. 5 fluctuates due to wavelength dispersion of the glass material of the compound prism 43. Thus, there is a problem in that an inclination occurs in an optical axis of the light beams that transmit through the compound prism 43 and travel to the objective lens 7. When the inclination occurs in the optical axis of the light beams traveling from the compound prism 43 to the objective lens 7, aberration occurs in a forward path optical system. Consequently, a quality of a light spot focused on the information recording surface of the optical recording medium 8 deteriorates. In addition, deviation occurs also in a condensing position in the photo-detector 12, and recording and reproduction characteristics of the optical head deteriorate.

On the other hand, as in the optical head in accordance with this embodiment, when the beam shaping prisms 51 and 52 forming a pair are used and the same glass material is used for the beam shaping prisms 51 and 52, deviation of an angle of refraction, which occurs on the surface 51a, occurs by the same amount in the opposite direction on the surface 52a. Thus, the deviation of the angle of refraction is offset. Consequently, the optical axis of the light beams traveling from the beam shaping prism 52 to the objective lens 7 does not become inclined, and the deterioration of a quality of the light spot, the deviation of the condensing position in the photo-detector 12, and the like described above do not occur.

As in the first to the third embodiments, in order to increase a reflectance, for example, mirror coating may be applied to, paint may be applied to more simply, or an aluminum foil may be stuck on the surface 51b of the beam shaping prism 51. Moreover, the beam shaping prism 52 arranged on the beam splitter 4 side may be compounded with the beam splitter 4.

As described above, the light beams transmitted through the collimate lens 3 are reflected on the side 51b of the beam shaping prism 51 arranged for shaping beams to be made incident on the photo-detector 13. Thus, it is unnecessary to provide an optical element anew for feedback control, and it is possible to reduce a size and cost of the optical head. In addition, since the light beams reflected by the side 51b is used, an intensity of the light beams transmitted through the beam shaping prism 51, which serve as light beams for recording and reproduction, does not weaken. Thus, speedup of recording of information is not prevented.

Fifth Embodiment

Figure 9:
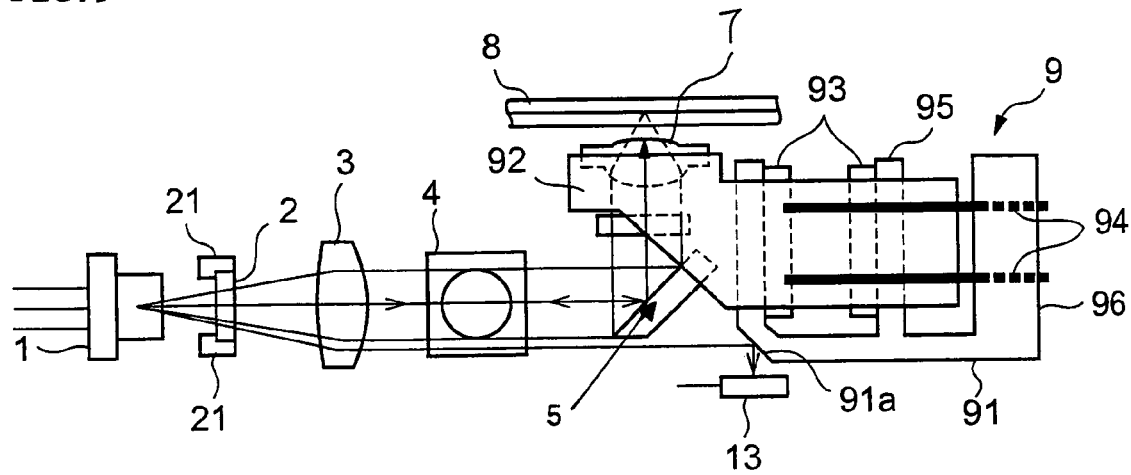
FIG. 9 is a side view of an optical head in accordance with a fifth embodiment of the present invention.

A structure and actions of an optical head in accordance with a fifth embodiment of the present invention will be explained with reference to FIGS. 9 and 10. FIG. 9 is a side view of the optical head in accordance with the fifth embodiment, and FIG. 10 is a plan view of the optical head in accordance with the fifth embodiment.

The optical head in accordance with the fifth embodiment has the same structure as the optical system of the optical heads in accordance with the first and the second embodiments. However, the optical head in accordance with the fifth embodiment is different from the optical heads in accordance with the first and the second embodiments in that a reflection surface is provided in a part of the actuator 9 to which the objective lens 7 is mounted. Therefore, in the optical head in accordance with this embodiment, light beams are reflected by the actuator 9 to perform output control for the light source 1.

Figure 10:
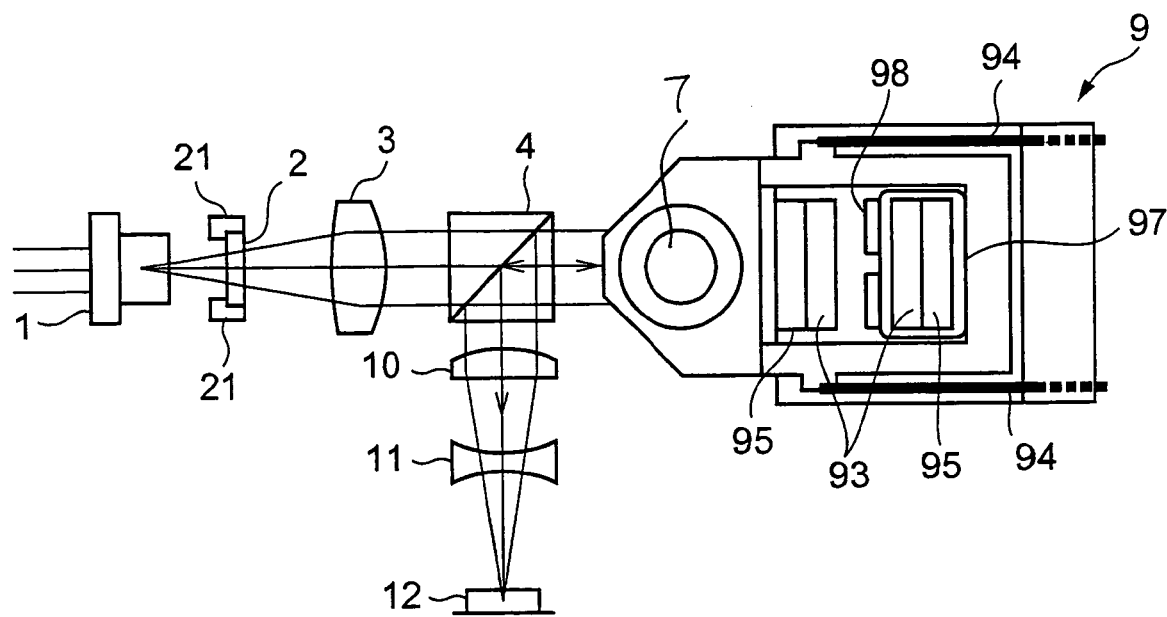
FIG. 10 is a top view of the optical head in accordance with the fifth embodiment.

As shown in FIGS. 9 and 10, the actuator 9 for an objective lens includes a lens holder 92 that holds the objective lens 7, a suspension wire 94 that supports the lens holder 92, a fixing member 96 that fixes one end of the suspension wire 94, and a base 91 that supports the fixing member 96. Moreover, in the actuator 9, a pair of permanent magnets 93 are set so as to face each other, and yokes 95 are provided in the respective permanent magnets 93. In addition, a coil 97 for focusing is wound around one of the permanent magnet 93 together with the yoke 95. A coil 98 for tracking is provided on a surface of the coil 97. The actuator 9 for an objective lens is arranged on the opposite side of the light source 1 with the reflection mirror 5 in between. A reflection surface 91a is provided at an end of the base 91 on the light source 1 side of the actuator 9. Note that the lens holder 92 moves up and down, whereby the actuator 9 moves the objective lens 7 in an optical axis direction. Therefore, a position of the reflection surface is not limited to an end face of the base 91. However, it is preferable that the reflection surface is provided in a part other than the lens holder 92 that is a movable section of the actuator.

As shown in FIGS. 9 and 10, a light beam emitted from the light source 1 is made incident on the refractive element 2 and split into three beams for tracking error signal generation. Then, the light beams transmitted through the refractive element 2 are changed to parallel beams by the collimating lens 3 and transmitted through the beam splitter 4. Light fluxes near the center of the light beams transmitted through the beam splitter 4 are made incident on the objective lens 7 and reflected by the objective lens 7 to be condensed on the information track of the optical recording medium 8. Then, the light beams reflected on the optical recording medium 8 are made incident on the photo-detector 12 through the same optical path as in the optical head in accordance with the embodiments described above and converted into an electric signal.

On the other hand, a part of peripheral light fluxes of the light beams transmitted through the beam splitter 4 are irradiated on an end of the base 91 of the actuator 9 through the outside of the rising mirror 5 without being made incident on the objective lens 7. The reflection surface 91a is formed at this end, and the irradiated light beams are reflected on the reflection surface 91a to be made incident on the photo-detector 13. Then, the light beams are converted into an electric signal for output monitor of the light source 1 and used for feedback control for an output of the light source 1.

Note that, in this embodiment, the peripheral light fluxes of the light beams are transmitted through the optical elements such as the refractive element 2 and the beam splitter 4 to be guided to the reflection surface 91a. However, the present invention is not limited to this. By reducing sizes of the optical elements such as the refractive element 2 and the beam splitter 4, an optical system may be designed such that peripheral light fluxes of a light beam emitted from the light source 1 pass the outside of the optical elements to be guided to the reflection surface 91a.

In addition, when a sufficient reflectance is not obtained on the reflection surface 91a of the base 91, as in the first to the fourth embodiments, it is possible to obtain a sufficient reflectance by sticking a seal such as an aluminum foil or applying paint for increasing a reflectance onto the reflection surface 91a.

As described above, the reflection surface 91a, which reflects a part of light beams emitted from the light source 1, is provided in a part of the actuator constituting the optical head. Thus, it is unnecessary to provide an additional optical element for feedback control, and it is possible to reduce a size and cost of the optical head. In addition, since feedback control for the light source 1 is performed using peripheral light fluxes of light beams, an intensity of light beams for recording and reproduction does not weaken. Thus, it is possible to realize speedup of recording and reproduction of information.

The present invention is not limited to the embodiments described above, and a reflecting section may be provided in a housing (made of an Al alloy, a Zn alloy, an Mg alloy, plastics, or the like) of an optical head to reflect a part of light beams. For example, it is possible to project a part of a wall surface of the housing onto an optical path and use the projected part as a reflecting section. This reflecting section may be provided in any position between a light source and an objective lens. For example, the reflecting section may be set so as to reflect a light beam immediately after being emitted from a light source or may be set so as to reflect light beams immediately after being transmitted through a collimate lens or the like. In addition, when a reflectance declines due to environmental and deterioration with age (oxidation, stains, etc.), an aluminum foil or the like may be stuck on or paint for increasing a reflectance may be applied to the reflecting section.

Sixth Embodiment

Figure 15:
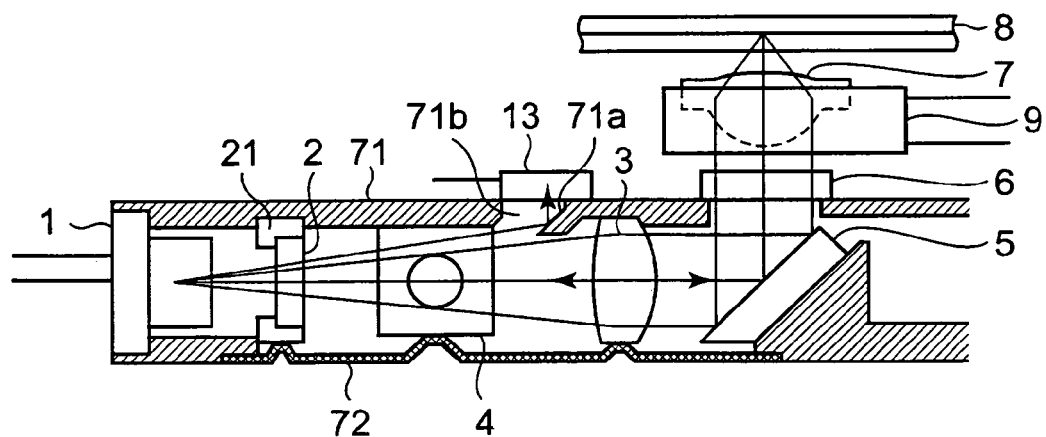
FIG. 15 is a side view (sectional view) of an optical head in accordance with a sixth embodiment of the present invention.

A structure and actions of an optical head in accordance with a sixth embodiment of the present invention will be explained with reference to FIG. 15. FIG. 15 is a side view (sectional view) of the optical head in accordance with the sixth embodiment.

The optical head in accordance with the sixth embodiment has substantially the same structure as the optical systems of the optical heads in accordance with the first and the second embodiments. However, the beam splitter 4 and the collimating lens 3 are arranged reversely. Light beams emitted from the light source 1 and transmitted through the diffractive element 2 are made incident on the beam splitter 4 first and then made incident on the collimating lens 3. By arranging the beam splitter 4 and the collimating lens 3 in this way, it is possible to reduce the size of the optical head.

In addition, FIG. 15 shows a housing 71 and a cover 72 that are not shown in the embodiments described above. This housing 71 houses the optical elements such as the light source 1, the diffractive element 2, the collimating lens 3, the beam splitter 4, and the reflection mirror 5 in the inside thereof and fixes the optical elements. In this embodiment, the light source 1, the diffractive element 2, the collimating lens 3, the beam splitter 4, and the reflection mirror 5 are housed in a line in the housing 71.

An opening 71b for guiding a part of light beams emitted from the light source 1 to the outside of the housing 71 is formed in a wall surface on an upper side (optical recording medium 8 side) of the housing 71. In this embodiment, the opening 71b is formed in a wall surface between the beam splitter 4 and the collimating lens 3. In addition, the opening 71b is formed in, for example, a rectangular shape. A side of the opening 71b is formed obliquely, and the oblique surface forms a reflection surface 71a. In addition, the reflection surface 71a is formed to face the outside of the housing 71 such that peripheral light fluxes of the light beams emitted from the light source 1 are irradiated on the outside of the housing 71. Moreover, in order to reflect the peripheral light fluxes of the light beams, this reflection surface 71a projects to the vicinity of light fluxes of light beams for recording or reproduction traveling to the optical recording medium 8. Note that the photo-detector 13 is set outside the housing 71.

A part of peripheral light fluxes of a light beam emitted from the light source 1 are irradiated on the reflection surface 71a formed obliquely. Since the reflection surface 71a faces the outside of the housing 71, a traveling direction of light beams irradiated on the reflection surface 71a is changed by reflection, and the light beams is guided to the outside of the housing 71 through the opening 71b formed in the housing 71 to be made incident on the photo-detector 13. Then, the light beams made incident on the photo-detector 13 are converted into an electric signal for output monitor and used for feedback control for an output of the light source 1.

Because a reflection surface is provided to the housing 71 housing the optical elements, it is unnecessary to provide an additional optical element for feedback control, and it is possible to reduce a size and cost of the optical head. In addition, the opening 71b is formed in the wall surface of the housing 71, and peripheral light fluxes of light beams traveling to the wall surface are guided to the outside of the housing 71. This makes it possible to perform feedback control for an output of the light source 1 without weakening an intensity of light beams used for recording and reproduction.

Moreover, because the reflection surface 71a is formed facing the outside of the housing 71, peripheral light fluxes of light beams reflected on the reflection surface 71a are guided to the outside of the housing 71 through the opening 71b. As a result, the peripheral light fluxes of the light beams reflected on the reflection surface 71a does not change into stray light in the housing 71 again. Therefore, it is possible to perform feedback control for an output of the light source 1 without affecting recording or reproduction.

In addition, because the reflection surface 71a is projected to an extent enough for the peripheral light fluxes of the light beams to reflect thereon, it is possible to minimize a space for providing the reflection surface 71a in the housing 71. Because a distance between optical elements (in this embodiment, a distance between the beam splitter 4 and the collimating lens 3) does not get longer even if the reflection surface 71a is provided, the size of the optical head does not increase more than necessary.

There is also a method of inserting the photo-detector 13 near the light fluxes of the light beams for recording and reproduction traveling to the optical recording medium 8 to receive light directly. However, according to the optical head in accordance with this embodiment, it is possible to prevent an increase in size compared with the method. In addition, a package is present around the light-receiving section of the photo-detector 13, and this package is arranged not to block a part of the light fluxes traveling to the optical recording medium 8. Thus, the light-receiving section is apart from the light fluxes traveling to the optical recording medium 8. However, according to the optical head in accordance with this embodiment, because peripheral light fluxes extremely close to the light fluxes traveling to the optical recording medium 8 can be guided to the photo-detector 13, it is possible to perform feedback control that corresponds to an intensity of light used for recording and reproduction extremely accurately.

Note that, by adjusting an angle of the reflection surface 71a, it is possible to make peripheral light fluxes of light beams reflected on the reflection surface 71a incident on the photo-detector 13 at an angle close to a right angle and increase photoelectric conversion efficiency as compared with the method of making peripheral light fluxes incident on the photo-detector 13 obliquely.

When the housing 71 is made of metal such as an Al alloy, a Zn alloy, or an Mg alloy, since light beams are reflected on the reflection surface 71a satisfactorily (a reflectance increases), it is possible to use the reflection surface 71a as it is without being subjected to working such as polishing. However, when the housing 71 is a die-cast product of the metal, since an oxide or the like is generated on a surface of the housing 71 depending upon casting conditions, a reflectance of the reflection surface 71a may fluctuate depending upon a location or roughness of the surface may cause a problem. In this case, it is advisable to polish the reflection surface 71a.

Moreover, when it is likely that a reflectance of the reflection surface 71a fluctuates due to an environment of use of the optical recording and reproducing apparatus, in order to prevent deterioration with age such as oxidation of the housing 71, it is possible to improve weather resistance by coating the reflection surface 71a with transparent resin. Since resin such as acrylic resin, epoxy resin, or unsaturated polyester resin only has to be applied, this does not lead to an increase in cost. It is needless to mention that a general rust-preventive agent may be used.

In addition, when the housing 71 is made of plastic, since the reflectance is low if no working is applied and reflection of light beams is insufficient, paint is applied to the reflection surface 71a in order to increase the reflectance. In this case, it is possible to increase the reflectance if resin paint containing a large amount of flaky (scaly) metal powder is used.

Note that the reflection surface 71a is not limited to a flat shape and may be formed as a recessed surface to have a light-condensing function. The same holds true for the embodiment described above, and the reflection surface in each embodiment may be formed as a recessed surface to have a function of condensing light beams.

As a method for achieving stable reflection on the reflection surface 71a at a high reflectance, a stainless steel piece or a film with a high reflectance may be stuck on the reflection surface 71a.

Setting positions of the photo-detector 13 and the reflection surface 71a are not limited to the positions explained in this embodiment and may be set in any locations as long as the photo-detectors 13 and the reflection surface 71a do not block light beams for recording or reproduction traveling to the optical recording medium 8. For example, an opening and a reflection surface may be formed between the diffractive element 2 and the beam splitter 4 to guide a part of light beams to the outside of the housing 71 from the opening. In addition, it is also possible to form an opening and a reflection surface on a lower side of the housing 71 (on the opposite side of the optical recording medium 8 across the housing 71) and to set a photo-detector on the lower side of the housing 71 to detect peripheral light fluxes of light beams.

Note that, in this embodiment, a cover 72 for preventing dusts from entering the optical head is set on the lower side of the housing 71 (on the opposite side of the optical recording medium 8). The cover 72 is removable from the housing 71. In this embodiment, the cover 72 presses the diffractive element 2, the beam splitter 4, and the collimate lens 3 from the lower side of the housing 71 (opposite side of the optical recording medium 8) to fix the diffractive element 2 and the like. Moreover, the cover 72 may have a function of radiating heat generated in the optical head.

Seventh Embodiment

Figure 16:
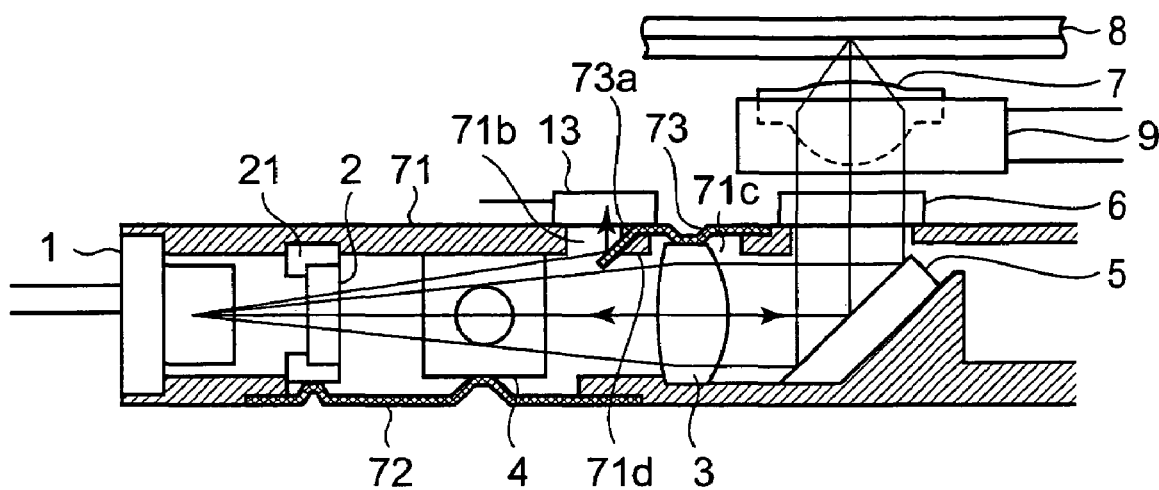
FIG. 16 is a side view (sectional view) of an optical head in accordance with a seventh embodiment of the present invention.

A structure and actions of an optical head in accordance with a seventh embodiment of the present invention will be explained with reference to FIG. 16. FIG. 16 is a side view (sectional view) of the optical head in accordance with the seventh embodiment.

The optical head in accordance with the seventh embodiment has the same optical system as the optical system of the optical head in accordance with the sixth embodiment. However, the optical head in accordance with the seventh embodiment is different from the optical head in accordance with the sixth embodiment in that a reflection surface is formed in a cover instead of forming a reflection surface in the housing 71. Therefore, unlike the sixth embodiment, light beams are reflected by the cover to perform output control for the light source 1.

As shown in FIG. 16, the optical elements such as the diffractive element 2 are housed inside the housing 71. The cover 72 is set on a lower side of the housing 71 (opposite side of the optical recording medium 8). The cover 72 presses the diffractive element 2 and the beam splitter 4 upward from the lower side of the housing 71 to fix the diffractive element 2 and the beam splitter 4. Moreover, another cover 73 is set on an upper side (optical recording medium 8 side) of the housing 71. The cover 73 presses the collimate lens 3 downward from the upper part of the housing 71 to fix the collimate lens 3.

The opening 71b for guiding a part of a light beam emitted from the light source 1 to the outside of the housing 71 is formed in a wall surface on the upper side (optical recording medium 8 side) of the housing 71. In this embodiment, the opening 71b is formed on a wall surface between the beam splitter 4 and the collimate lens 3. A part of the cover 73 is inserted into the opening 71b and introduced into the inside of the housing 71. Moreover, the part of the cover 73 introduced into the housing 71 is formed obliquely, and the oblique surface forms a reflection surface 73a for light beams. The reflection surface 73a is formed so as to face the outside of the housing 71 such that peripheral light fluxes of a light beam emitted from the light source 1 are irradiated to the outside of the housing 71. Moreover, the part of the cover 73 where the reflection surface 73a is formed projects to the vicinity of light fluxes of light beams to such an extent that this part reflects peripheral light fluxes of light beams for recording or reproduction traveling to the optical recording medium 8. The part of the cover 73 where the reflection surface 73a is formed is thus inserted into an optical path of the peripheral light fluxes of the light beams, whereby the reflection surface 73a reflects only the peripheral light fluxes of the light beams and does not reflect light beams that are to be irradiated on the optical recording medium 8 for recording or reproduction of information. Note that this part of the cover inserted into the optical path of the peripheral light fluxes of the light beams corresponds to "a part of the cover" as referred to in the present invention.

A part of peripheral light fluxes of a light beam emitted from the light source 1 are irradiated on the reflection surface 73*a* formed obliquely. Since the reflection surface 73*a* faces the outside of the housing 71, the traveling direction of light beams irradiated on the reflection surface 73*a* is changed by reflection, and the light beams are guided to the outside of the housing 71 through the opening 71*b* formed in the housing 71 to be made incident on the photo-detector 13. Then, the light beams made incident on the photo-detector 13 are converted into an electric signal for output monitor and used for feedback control for an output of the light source 1.

Because a part of the cover 73 set in the housing 71 is used as a reflection surface in this way, it is unnecessary to provide an additional optical element for feedback control, and it is possible to reduce the size and cost of the optical head. In addition, the opening 71*b* is formed in the wall surface of the housing 71, and a part of the cover 73 is inserted into the opening 71*b* to serve as the reflection surface 73*a* to thereby guide peripheral light fluxes of light beams traveling to the wall surface to the outside of the housing 71. This makes it possible to perform feedback control for an output of the light source 1 without weakening an intensity of light beams used for recording and reproduction.

Moreover, because the reflection surface 73*a* is formed facing the outside of the housing 71, peripheral light fluxes of light beams reflected on the reflection surface 73*a* are guided to the outside of the housing 71 through the opening 71*b*. As a result, the peripheral light fluxes of the light beams reflected on the reflection surface 73*a* do not change to stray light in the housing 71 again. Therefore, it is possible to perform feedback control for an output of the light source 1 without affecting recording or reproduction.

In addition, because apart of the cover 73 on which the reflection surface 73*a* is formed is inserted into an optical path of peripheral light fluxes of light beams to an extent sufficient for the peripheral light fluxes of the light beams to be reflected thereon, it is possible to keep the space for inserting the reflection surface 73*a* into the housing 71 to a minimum. Consequently, because the distance between optical elements (in this embodiment, the distance between the beam splitter 4 and the collimating lens 3) does not increase more than necessary even if the reflection surface 73*a* is inserted, the size of the optical head does not increase more than necessary.

As the covers 72 and 73 used for the optical head, usually, a metal plate having both a thickness of 0.5 mm or less and strength is used, and a steel plate of stainless steel, brass, or the like is used. Since these materials have sufficient weather resistance in itself or can be subjected to plating treatment easily, stable reflectance can be kept.

Note that, in this embodiment, in order to press the collimating lens 3 from the upper side (optical recording medium 8 side) of the housing 71, another opening 71*c* is formed in the housing 71, and the cover 73 is fit in the opening 71*c* to press and fix the collimating lens 3. In addition, because a part of light beams is extracted between the beam splitter 4 and the collimating lens 3, the opening 71*b* is formed on the upper side (optical recording medium 8 side) of the housing 71 between the beam splitter 4 and the collimating lens 3. In this embodiment, in order to stabilize a position and a shape of the reflection surface 73*a* of the cover 73, a beam 71*d* is provided between the opening 71*b* and another opening 71*c*. The beam 71*d* extends in a direction perpendicular to the plane of FIG. 16. The back of the reflection surface 73*a* of the cover 73 is brought into contact with the beam 71*d* so as to be pressed against the back to fix the reflection surface 73*a*.

When the photo-detector 13 is attached to the optical head, it is desirable that the attaching position be adjusted such that a light-receiving amount of the photo-detector 13 is maximized.

Note that the covers 72 and 73 are used to prevent dusts from entering the housing 71 of the optical head. In addition, the covers 72 and 73 are fixed to the housing 71 by screw or adhesion. As described above, in this embodiment, the cover 73 supports the fixing of the collimating lens 3. The collimating lens 3 is fixed to the housing 71 by ultraviolet curing resin, and the fixing is reinforced by the spring force of the cover 73. The covers 72 and 73 may have a function of radiating heat, which is generated from the light source 1 consisting of a semiconductor laser, a laser driver IC, or the like, to the outside.

Setting positions of the photo-detector 13 and the reflection surface 73*a* are not limited to the positions explained in this embodiment and may be set in any locations as long as the photo-detectors 13 and the reflection surface 73*a* do not block light beams for recording or reproduction traveling to the optical recording medium 8. As explained in the sixth embodiment, an opening and a reflection surface may be formed between the diffractive element 2 and the beam splitter 4 to guide a part of light beams to the outside of the housing 71 from the opening. In addition, it is also possible to form an opening and a reflection surface on a lower side of the housing 71 (on the opposite side of the optical recording medium 8 across the housing 71) and set a photo-detector on the lower side of the housing 71 to detect peripheral light fluxes of light beams.

Eighth Embodiment

Figure 11:
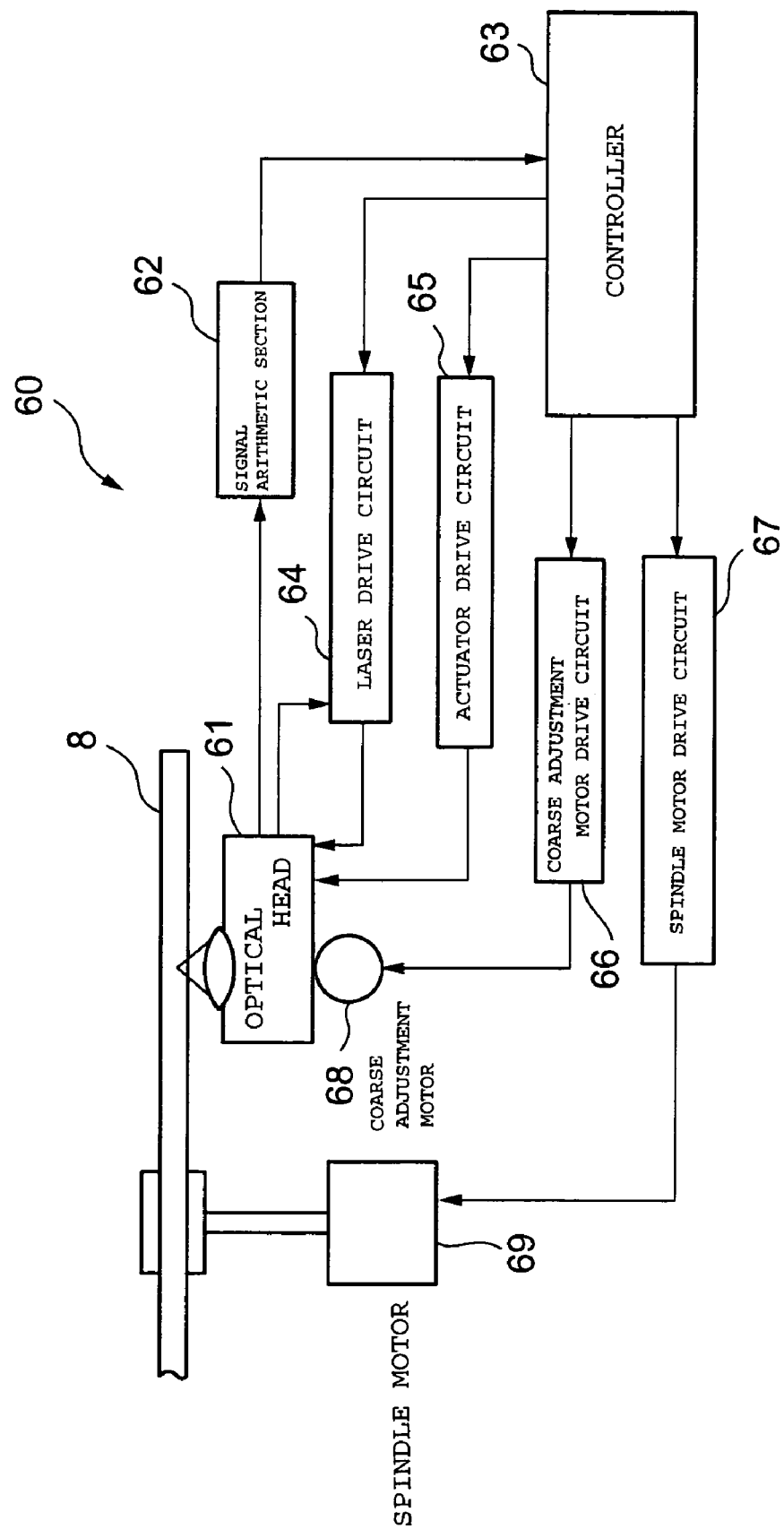
FIG. 11 is a schematic diagram of an optical recording and reproducing apparatus mounted with the optical head of the present invention.
Figure 12:
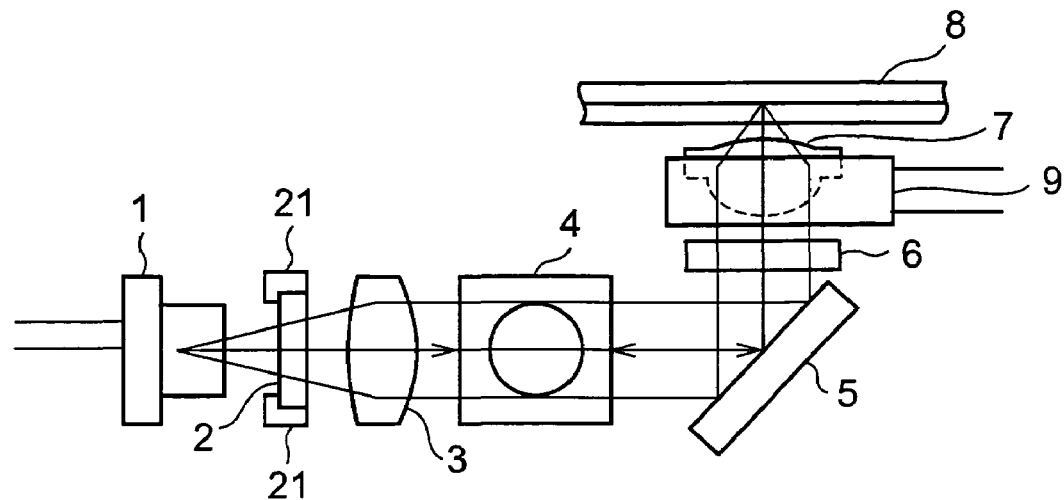
FIG. 12 is a side view of a conventional optical head.
Figure 13:
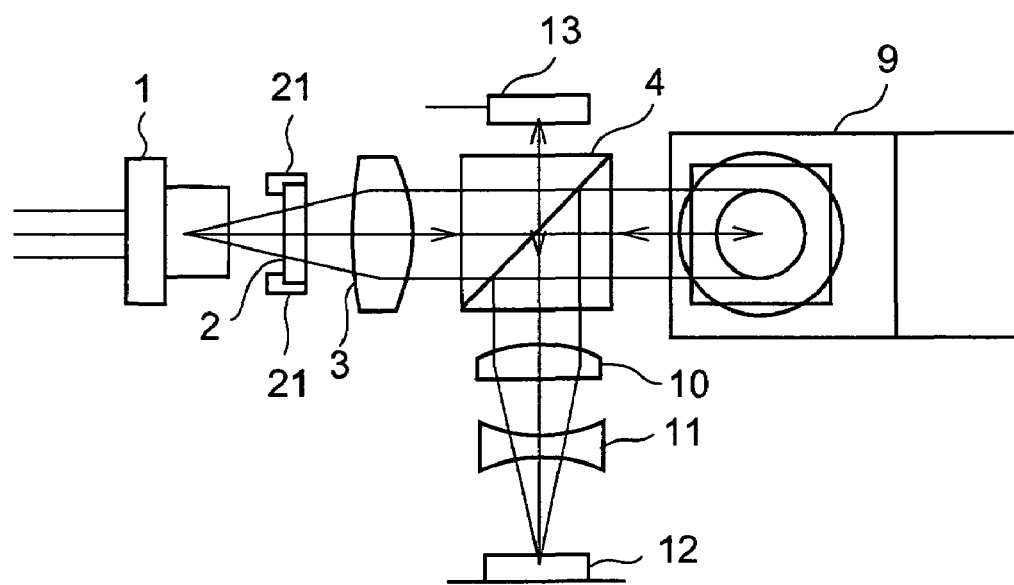
FIG. 13 is a top view of the conventional optical head.
Figure 14:
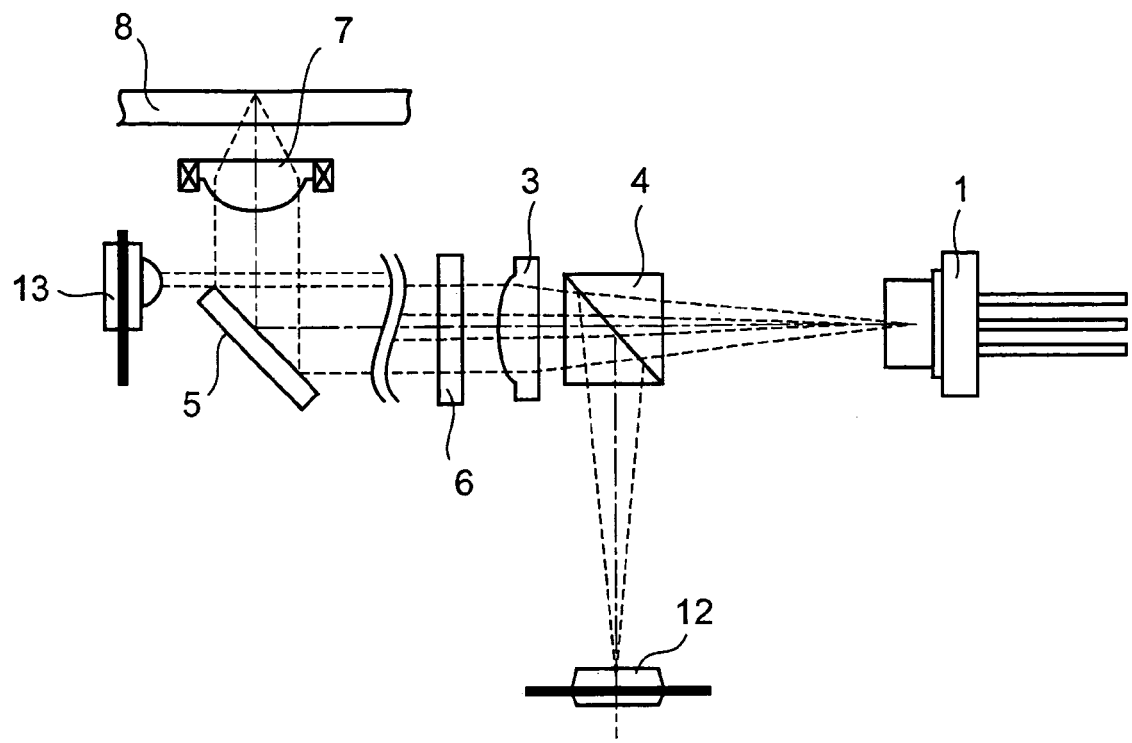
FIG. 14 is a side view of the conventional optical head.

Next, as an eighth embodiment of the present invention, an optical recording and reproducing apparatus including the optical head of the present invention will be explained with reference to FIG. 11. FIG. 11 is a block diagram of the optical recording and reproducing apparatus in accordance with the eighth embodiment.

An optical recording and reproducing apparatus 60 in accordance with this embodiment reproduces information recorded in the optical recording medium 8 that is chucked to a spindle motor 69 by chucking means (not shown). An optical head 61 is provided in a chassis (not shown) including a slider mechanism and is made movable in the radial direction of the optical recording medium 8 by a coarse adjustment motor 68. The optical head of the present invention is used as the optical head 61.

An electric signal outputted from the optical head 61 is inputted to a signal arithmetic section 62, and the signal arithmetic section 62 performs an arithmetic operation and amplification for the electric signal. Note that the signal arithmetic section 62 may be mounted on the optical head 61. A focus servo follower circuit, a tracking servo follower circuit, and a laser control circuit are included in the controller 63 to control operations of the optical head 61 and the spindle motor 69. These circuits may be software to be executed in a controller rather than a physical circuit. The controller 63 performs calculation of servo signals such as a focus error signal and a tracking error signal other than a data reproduction signal on the basis of the electric signal from the optical head 61. The data reproduction signal is subjected to waveform equalization and waveform shaping by a not-shown digital signal processing circuit. Thereafter, the data reproduction signal is outputted as an analog signal by a not-shown D/A converter. When recording of information is performed, the controller 63 converts recorded data into a laser drive signal and supplies the laser drive signal to the optical head 61 with a laser driver circuit 64 to record data.

Then, an actuator driver circuit 65 receives the focus error signal, the tracking error signal, and the like to perform focus position control and tracking position control for an objective lens of the optical head 61. A spindle motor drive circuit 67 drives the spindle motor 69 to perform rotation control of the optical recording medium 8. A coarse adjustment motor driver circuit 66 drives the coarse adjustment motor 68 to move the optical head 61 in the radial direction of the optical recording medium 8. The laser drive circuit 64 supplies a laser drive signal to the optical head 61 and controls an output of the light source 1 of the optical head 61. Note that the laser drive circuit 64 may be mounted on the optical head 61. Moreover, an output of the photo-detector 13 is fed back to the laser drive circuit 64 to drive the light source 1 to have a predetermined output.

The optical recording and reproducing apparatus 60 of this embodiment includes a CPU that controls the entire apparatus, a memory, an interface that transmits and receives signals to and from the outside, and the like.

In the optical recording and reproducing apparatus 60, an output of the photo-detector 13 of the optical head 61 is fed back to the laser drive circuit 64 to drive the light source 1 to have a predetermined output. This makes it possible to control an output of the light source 1 stably. As a result, it is possible to perform recording of information stably and detect a stable reproduction signal. In addition, it is possible to realize a reduction in cost of an optical recording and reproducing apparatus by mounting the optical head of the present invention on the optical recording and reproducing apparatus. Since an intensity of light beams used for recording and reproduction does not weaken, it is possible to perform recording and reproduction of information at high speed.

Note that the present invention has been explained as the optical recording and reproducing apparatus. However, the present invention may be implemented as an optical reproducing apparatus that performs reproduction of an optical signal exclusively.

What is claimed is:

1. An optical head comprising:
    a light source;
    an objective lens that condenses light beams emitted from the light source on an information recording surface of an optical recording medium;
    an optical element that is provided between the light source and the objective lens and makes the light beams emitted from the light source incident on the objective lens;
    a holder that is provided around the circumferential surface of the optical element to hold the optical element and has a reflection surface for reflecting a part of the light beams emitted from the light source to the exterior of the optical element; and
    a photo-detector that detects the light beams reflected off the reflection surface of the holder,
    wherein the reflected light beams are substantially perpendicularly incident on the photo-detector.

2. An optical head according to claim 1, wherein the holder is set at an end of the optical element.

3. An optical head according to claim 1, wherein the optical element is a diffractive element.

4. An optical head according to claim 1, wherein the optical element is a positive lens.

5. An optical head according to claim 4, wherein the positive lens is a collimate lens.

6. An optical head according to claim 1, wherein
    the holder comprises a housing, in which the light beams travel, for housing the optical element, the housing having an opening in which a reflection surface for reflecting to the exterior of the housing a part of the light beams emitted from the light source to the opening is formed, and
    the photo-detector is set outside the housing and detects the light beams reflected on the reflection surface and guided to an outside of the housing from the opening.

7. An optical head according to claim 1, wherein the holder includes:
    a housing in which the light beams travel that has an opening formed therein and houses the optical element; and
    a cover having a reflection surface formed in one part thereof, the one part of the cover being inserted from the opening of the housing and introduced into the housing, the cover covering another part of the opening with the other part of the cover, the cover reflecting the light beams that travel to the one part of the cover to the exterior of the housing through the reflection surface, and
    the photo-detector is set outside the housing and detects the light beams reflected on the reflection surface of the cover and guided to an outside of the housing from the opening of the housing.

8. An optical head according to claim 1, wherein a reflectance with respect to the light beams is higher on the reflection surface than in a periphery of the reflection surface.

9. An optical head according to claim 1, wherein the reflection surface is covered with one of resin and a rust-preventive agent.

10. An optical head according to claim 1, wherein an output of the light source is controlled based on a signal from the photo-detector.

11. An optical reproducing apparatus comprising:
    a light source;
    an objective lens that condenses light beams emitted from the light source on an information recording surface of an optical recording medium;
    an optical element that is provided between the light source and the objective lens and makes the light beams emitted from the light source incident on the objective lens;
    a holder that is provided around the circumferential surface optical element to hold the optical element and has a reflection surface for reflecting a part of the light beams emitted from the light source; and
    a photo-detector that detects the light beams reflected off the reflection surface of the holder,
    wherein the reflected light beams are substantially perpendicularly incident on the photo-detector.

12. An optical reproducing apparatus according to claim 11, comprising:
    control means for controlling an output of the light source based on a signal from the photo-detector of the optical head.

13. An optical recording and reproducing apparatus comprising: a light source;
    an objective lens that condenses light beams emitted from the light source on an information recording surface of an optical recording medium;

an optical element that is provided between the light source and the objective lens and makes the light beams emitted from the light source incident on the objective lens;

a holder that is provided around the circumferential surface of the optical element to hold the optical element and has a reflection surface for reflecting a part of the light beams emitted from the light source; and a photo-detector that detects the light beams reflected off the reflection surface of the holder, wherein the reflected light beams are substantially perpendicularly incident on the photo-detector.

14. An optical recording and reproducing apparatus according to claim 13, comprising:

control means for controlling an output of the light source based on a signal from the photo-detector of the optical head.

* * * * *